(12) United States Patent
Kullmann

(10) Patent No.: US 12,103,096 B2
(45) Date of Patent: Oct. 1, 2024

(54) MACHINING TOOL HAVING ASYMMETRICAL TEETH HAVING CUTTING PARTICLES

(71) Applicant: WIKUS-Sägenfabrik Wilhelm H. Kullmann GmbH & Co. KG, Spangenberg (DE)

(72) Inventor: Jörg H. Kullmann, Spangenberg (DE)

(73) Assignee: WIKUS-Sägenfabrik Wilhelm H. Kullmann GmbH & Co. KG, Spangenberg (DE)

( * ) Notice: Subject to any disclaimer, the term of this patent is extended or adjusted under 35 U.S.C. 154(b) by 0 days.

(21) Appl. No.: 17/547,823

(22) Filed: Dec. 10, 2021

(65) Prior Publication Data

US 2022/0097157 A1 Mar. 31, 2022

Related U.S. Application Data

(63) Continuation of application No. PCT/EP2020/066756, filed on Jun. 17, 2020.

(30) Foreign Application Priority Data

Jul. 2, 2019 (DE) .................... 10 2019 117 799.5

(51) Int. Cl.
*B23D 61/02* (2006.01)
*B23D 61/12* (2006.01)
*B28D 1/12* (2006.01)

(52) U.S. Cl.
CPC ......... *B23D 61/021* (2013.01); *B23D 61/121* (2013.01); *B28D 1/121* (2013.01); *B28D 1/127* (2013.01)

(58) Field of Classification Search
CPC .................................................... B23D 61/127
See application file for complete search history.

(56) References Cited

U.S. PATENT DOCUMENTS

| | | | | |
|---|---|---|---|---|
| 3,615,309 A * | 10/1971 | Dawson | ................. | B23D 65/00 |
| | | | | 51/293 |
| 4,659,436 A * | 4/1987 | Kaylor | ................. | B23D 61/127 |
| | | | | 205/110 |
| 4,925,457 A | 5/1990 | DeKok | | |
| 5,511,603 A * | 4/1996 | Brown | ...................... | B22F 3/26 |
| | | | | 164/97 |

(Continued)

FOREIGN PATENT DOCUMENTS

| CN | 106 625 304 A | 5/2017 |
|---|---|---|
| CN | 106 660 138 A | 5/2017 |

(Continued)

OTHER PUBLICATIONS

Catalog "Präzisions-Sägebänder", edition 2017, p. 41.
International Report on Patentability for PCT/EP2020/066756 dated Jul. 2, 2019.

*Primary Examiner* — Sean M Michalski
(74) *Attorney, Agent, or Firm* — The Sladkus Law Group

(57) ABSTRACT

A machining tool (1) includes a tooth (3) having a tooth tip (4) being covered with cutting particles (5) to form a plurality of geometrically undefined cutting portions. The tooth tip (4) is designed to be asymmetrical. The machining tool (1) thus is a 2-in-1 machining tool including differently designed sides of the tooth tips (4) which are suitable for efficiently machining different materials.

13 Claims, 21 Drawing Sheets

(56) References Cited

U.S. PATENT DOCUMENTS

| | | | |
|---|---|---|---|
| 5,981,057 A | 11/1999 | Collins | |
| 9,828,254 B2 | 11/2017 | Imamura | |
| 11,819,978 B2 | 11/2023 | Takagi | |
| 2003/0192419 A1* | 10/2003 | Conti | B23D 61/126 83/837 |
| 2003/0209125 A1 | 11/2003 | Bertolet | |
| 2005/0048879 A1 | 3/2005 | Skeem | |
| 2005/0060941 A1 | 3/2005 | Provow | |
| 2017/0189977 A1 | 7/2017 | Read | |
| 2019/0210129 A1 | 7/2019 | Read | |

FOREIGN PATENT DOCUMENTS

| | | |
|---|---|---|
| DE | 293 300 A5 | 8/1991 |
| DE | 697 00 910 T2 | 6/2000 |
| DE | 10 2010 062 073 A1 | 5/2012 |
| EP | 0 569 770 A1 | 11/1993 |
| JP | H 03-079219 A | 4/1991 |
| JP | H 10-128673 A | 5/1998 |
| JP | 2006-015446 A | 1/2006 |
| JP | 2009-196058 A | 9/2009 |
| JP | 2010-179409 A | 8/2010 |
| JP | 2015-166125 A | 9/2015 |
| JP | 2018-174199 A | 11/2018 |
| KR | 20-0164555 Y1 | 2/2000 |
| RU | 2114723 C1 | 7/1998 |
| TW | 378 167 B | 1/2000 |
| WO | 2005/035198 A1 | 4/2005 |
| WO | 2008/119299 A1 | 10/2008 |
| WO | 2017/163565 A | 9/2017 |

* cited by examiner

MACHINING TOOL HAVING ASYMMETRICAL TEETH HAVING CUTTING PARTICLES

CROSS REFERENCE TO RELATED APPLICATIONS

This application is a continuation of international application PCT/EP2020/066756 with an international filing date of Jun. 17, 2020 entitled "Machining tool having asymmetrical teeth having cutting particles" and claiming priority to co-pending German patent application No. DE 10 2019 117 799.5 entitled "Zerspanungswerkzeug mit asymmetrischen Zähnen mit Schneidpartikeln" filed on Jul. 2, 2019.

FIELD OF THE INVENTION

The present invention relates to a machining tool including a tooth having a tooth tip being covered with cutting particles to form a plurality of geometrically undefined cutting portions.

In contrast to saw blades including geometrically defined cutting portions, such machining tools including geometrically undefined cutting portions are often used not to machine and saw, respectively, metal, but instead other materials—such as glass, graphite, hard-burnt coal, ceramics, silicon, concrete materials, CFK, sintered materials and natural stones.

BACKGROUND OF THE INVENTION

A grinding-cutting tool including a tooth having a tooth tip being covered with cutting particles to form a plurality of geometrically undefined cutting portions is known from German patent DE 697 00 910 T2 corresponding to US patent application US 2005/0048879 A1. The tooth tip has a longitudinal center axis, a plateau surface, a first connecting surface and a second connecting surface. The first connecting surface and the second connecting surface are directly connected to the plateau surface. In the embodiment illustrated in FIG. 8, the tooth tip is designed to be asymmetrical.

A machining tool including an integrated lubricant is known from German patent application DE 10 2010 062 073 A1.

A method of producing a grinding tool is known from European patent application EP 0 569 770 A1.

A machining tool for machining two different materials is known from US American patent application US 2017/0189977 A1.

A machining tool including a tooth having a tooth tip being covered with cutting particles to form a plurality of geometrically undefined cutting portions is known as the saw band under the trademark "DIAGRIT" by the applicant, for example from the catalog "PRÄZISIONS-SÄGEBÄNDER", edition 2017, page 41 by the applicant. The tooth tip has a longitudinal center axis, a plateau surface, a first connecting surface and a second connecting surface. The first connecting surface and the second connecting surface are directly connected to the plateau surface. Both connecting surfaces extend at their respective side of the longitudinal center axis under the same tooth tip angle (i.e. the value of the angles is identical) with respect to the plateau surface. The tooth tip angle is approximately 0°, i.e. the connecting surface extends approximately parallel to the longitudinal center axis of the tooth tip.

SUMMARY OF THE INVENTION

The present invention relates to a machining tool including a tooth having a tooth tip being covered with cutting particles to form a plurality of geometrically undefined cutting portions. The tooth tip is designed to be asymmetrical.

The present invention also relates to a method of machining two workpieces of different materials with exactly one machining tool including a tooth having an asymmetrical tooth tip being coated with cutting particles to form a plurality of geometrically undefined cutting portions. The machining tool is inserted into a machining apparatus including a motor in a first orientation. Then, a first workpiece of a first material is machined with the machining tool in the first orientation by driving the machining tool in a first sense of direction of movement.

Afterwards, according to a first alternative a, the motor is switched to drive the machining tool in an opposite second sense of direction of movement and a second workpiece of a different second material is then machined with the machining tool in the first orientation.

According to a second alternative b, instead the machining tool is removed from the machining apparatus and the machining tool is inserted into the machining apparatus in an opposite second orientation. Afterwards, a second workpiece of a different second material is machined with the machining tool in the second orientation by driving the machining tool in the first sense of direction of movement.

Definitions

The feature of the asymmetrical design of the tooth tip is to be understood such that the tooth tip is designed to be asymmetrical with respect to its base geometry without considering the cutting particles. The tooth tip is designed to be asymmetrical in the plane of main extension of the machining tool. The plane of main extension of the machining tool corresponds to the plane of illustration of FIGS. 2 and 5, for example. The direction of movement of the machining tool and the height of the tooth are located in the plane of main extension. The longitudinal center axis of the tooth tip is also arranged in the plane of main extension. In case of a band-shaped base body, the longitudinal center axis extends perpendicular to the direction of movement of the machining tool. Thus, the asymmetrical tooth tip is designed such that it has a different design at a first side of the longitudinal center axis than at an opposite second side of the longitudinal center axis.

In other words, the tooth tip as seen in a side view in the direction of movement of the machining tool is asymmetrical in a way that the value of the angle of the first surface of the tooth tip that first get in contact with the workpiece in a first sense of direction of movement of the machining tool differs from the value of the angle of the second surface of the tooth tip that first gets in contact with the workpiece in the opposite second sense of direction of movement of the machining tool.

The tooth tip includes a longitudinal center axis, a plateau surface, a first connecting surface and a second connecting surface. The first connecting surface and the second connecting surface are directly or indirectly connected to the plateau surface. The first connecting surface extends at a first side of the longitudinal center axis under a first tooth tip angle having a first value with respect to the plateau surface. The second connecting surface extends at the opposite second side of the longitudinal center axis under a second tooth tip angle having a different second value with respect to the plateau surface. The values of the tooth tip angles are different, which results in the tooth tip surface being asymmetrical.

The connecting surface preceding as seen in the direction of movement of the machining tool corresponds to the chip surface of the tooth tip of a saw blade as far as its arrangement is concerned. The connecting surface following as seen in the direction of movement of the machining tool corresponds to the clearance surface of the tooth tip of a saw blade as far as its arrangement is concerned. When the sense of direction of movement or the orientation of the machining tool is inverted, the functionality of the connecting surfaces is inverted correspondingly.

The tooth tip angle of the connecting surface preceding as seen in the direction of movement of the machining tool corresponds to the rake angle of the tooth tip of a saw blade as far as its arrangement is concerned. The tooth tip angle of the connecting surface following as seen in the direction of movement of the machining tool corresponds to the clearance angle of the tooth tip of a saw blade as far as its arrangement is concerned. When the sense of direction of movement or the orientation of the machining tool is inverted, the functionality of the tooth tip angle is inverted correspondingly.

When the tooth tip angle is negative, the connecting surface of the tooth tip that precedes as seen in the direction of movement of the machining tool is declined towards the rear. When the tooth tip angle is positive, the connecting surface of the tooth tip that follows as seen in the direction of movement of the machining tool is declined towards the front. A positive tooth tip angle is more aggressive than a negative tooth tip angle as far as its machining properties are concerned. To make this clear, it is also referred to FIG. 8 in which the first connecting surface 8 extends under a negative tooth tip angle.

The production method realized by the machining tool (or chipping tool) is designated as machining (or chipping) according to DIN 8589-0. According to this standard, in machining, one distinguishes between machining with geometrically defined cutting portions and machining with geometrically undefined cutting portions. According to DIN 8589-6, sawing belongs to machining with geometrically defined cutting portions. The present machining tool works with geometrically undefined cutting portions such that it is not a sawing tool according to the mentioned standards. For this reason, the correct generalizing term of a machining tool is used in this application. Practically, machining tools from this technical field including cutting particles are nevertheless also designated as saw bands and saw blades, respectively.

Cutting particles are to be understood in this application as being particles that have the effect that the workpiece is machined. They are made of a cutting material, or they include a cutting material. A cutting material is a material that is suitable for cutting and machining workpieces. Thus, the cutting particles are also cutting material particles.

Buffer particles are to be understood in this application as being particles that, due to their presence and their arrangement, have the effect to create distances between the cutting particles and thus form a buffer between the cutting particles. The buffer particles at least do not eventually cause machining of the workpiece, and they thus are no cutting particles. The buffer particles may be made of different materials. However, it is also possible that the buffer particles are made of a cutting material or that they include a cutting material. The buffer particles then are cutting material particles, but no cutting particles.

Further Description

The new machining tool is a 2-in-1 machining tool including teeth the sides and the tooth tips, respectively, of which are differently designed for efficiently machining different materials. Due to the asymmetry of the tooth tip, different objects and purposes are assigned to the different sides. The one side of the tooth tip is optimized for machining a first group of materials and the other side is optimized for machining a different second group of materials.

When machining with a rotatingly driven machining tool, the driving sense of direction determines which one of the two sides of the tooth tip gets in contact with the workpiece to form chips and to batter the workpiece, respectively. This is the side that precedes in the sense of direction of movement. The other side that follows in the sense of direction of movement is initially inactive. However, this in active side can now be activated and used to machine a different second material. This is either achieved by inverting the driving sense of direction and thus the sense of direction of movement of the machining tool or by inserting the machining tool into the machining apparatus in an opposite second orientation. Then, the second side of the tooth tip is active and the first side is inactive.

The materials to be machined are especially nonmetallic inorganic materials and composite materials. These materials may be especially glass, graphite, hard-burnt coal, ceramics, silicon, concrete materials, CFK, sintered materials and natural stones. However, they may also be metal materials.

Some of these materials have comparatively strongly differing properties which leads to the fact that some materials can be better machined with a positive tooth tip angle or a tooth tip angle of approximately 0° and other materials can be better machined with a negative tooth tip angle.

In this way, it is e.g. possible that the connecting surface at the one side is associated with brittle materials and the other side is associated with ductile (viscous) materials.

The brittle materials may be especially ceramics, silicon, glass, cast iron, concrete, building bricks, natural stones, brittle metals and Bakelite. The ductile materials may be especially ductile concrete, ductile cast iron and ductile metals. Ductile materials, i.e. materials having a great toughness, have a good elastic-plastic deformability before breakage.

In case of brittle materials, it is preferred to design and use the machining tool such that they are machined by a tooth tip having a connecting surface preceding in the sense of direction of movement that has a negative tooth tip angle. The more gentle machining properties realized thereby reduce or eliminate the danger of the workpiece breaking during machining.

In case of ductile materials, it is preferred to design and use the machining tool such that they are machined by a tooth tip having a connecting surface preceding in the sense of direction of movement that has a positive tooth tip angle or a tooth tip angle of 0°. The more aggressive machining properties realized thereby are well suitable for quickly machining such tough and hard materials.

The first tooth tip angle is <0° and the second tooth tip angle is ≥0°. The values of the tooth tip angles differ which results in the tooth tip being designed to be asymmetrical.

The first tooth tip angle may be especially between <0° and −80° and the second tooth tip angle may be especially between 0° and 20°.

The first tooth tip angle may be between −1° and −75°, especially between −1° and −73°, especially between −1° and −71°, especially between −40° and −80°, especially between −40° and −75°, especially between −40° and −70°, especially between −40° and −50°, especially between −42° and −48°, especially approximately −45°. The second tooth tip angle may be between 0° and 15°, especially between 0° and 12°, especially between 0° and 10°, especially between 3° and 13°, especially between 5° and 15°, especially between a degrees and 12°, especially approximately 10°.

The connecting surfaces (or the machining surfaces) of the tooth tips may be designed as plain (even) or uneven surfaces. In case of a negative tooth tip angle, the respective active connecting surface is especially designed to be plain. In case of a positive tooth tip angle, the respective active connecting surface is especially designed to be at least partly uneven. For example, it is possible that the connecting surface in its region facing away from the tooth supporting body is designed to be plain and then changes into a circular are or differently curved region.

The tooth tips of the teeth of the new machining tool are covered with at least two different types of particles having different properties and being associated with different functions.

The first type of particles are cutting particles of a cutting material as they are generally known in the prior art. The cutting particles have the effect of the workpiece being machined. The second type of particles are buffer particles serving to increase the average distances between the cutting particles.

In the prior art, when covering the tooth tip of a tooth with cutting particles, there is the problem that so called nests including an increased number of cutting particles per surface and thus a great packing density are formed. This results in, during machining, a great number of geometrically undefined cutting portions engaging the material to be machined. This results in a reduction of the cutting performance. Thereby, the feed force becomes too great which, in turn, leads to the machining tool being laterally dislocated. In this way, the straight cut is not attained as desired. To counteract this, it is possible to use an increased feed speed. However, in other portions in which the packing density of the cutting particles is smaller, this leads to these cutting particles being subjected to a greater cutting force and thus wearing out quicker. The usable lifetime of the machining tool is reduced by this.

Furthermore, there is the problem in the prior art that, with such a great packing density of the cutting particles, there are no sufficient intermediate spaces for removing the material of the machined material and thus is not removed from the cutting channel to the required extent.

These disadvantages of the prior art are now eliminated and substantially reduced, respectively, by the new buffer particles of the new machining tool. Due to the buffer particles, the creation of nests and thus a packing density of cutting particles being too great are prevented and substantially reduced, respectively. The buffer particles form some sort of spacers between the cutting particles such that the desired distances between the geometrically undefined cutting portions of the cutting particles are realized.

The buffer particles are located between the cutting particles. However, this is not to be understood such that each buffer particle has to be located exactly between two adjacent cutting particles. The exact position of the particles mostly results during manufacturing according to a stochastic distribution such that a plurality of buffer particles and/or a plurality of cutting particles may be arranged adjacent to one another. However, the other arrangement of a buffer particle exactly between two cutting particles also exists.

When the buffer particles are removed in the later course of the manufacturing method, during a separate initializing method or only after the beginning of machining, the required free spaces between the cutting particles are created to remove the machined material from the cutting channel.

The cutting particles and the buffer particles have different physical properties. They consist of different materials and/or they have been treated differently such that they are different with respect to at least one physical property allowing for associating different functions to the particles.

The physical property differentiating the cutting particles from the buffer particles is chosen and used such that the respective particle fulfills its desired function. In case of the buffer particles, this means that the geometrically undefined cutting portions being initially formed by them are later rendered ineffective or removed.

A first possibility is that the buffer particles have a lower hardness than the cutting particles. This lower hardness is used such that the buffer particles are torn down or removed during a process to which the cutting particles are also subjected, while the cutting particles are maintained. This process may be the use of the machining tool for machining or a different process being separately provided for this purpose. For example, this may be a step of the manufacturing method of the machining tool by which the buffer particles are fully or partly removed.

Alternatively or additionally, the buffer particles may have a lower heat resistance than the cutting particles. This lower heat resistance is used in the sense that the machining tool is subjected to a heat process during which such a high temperature prevails leading to complete or partial removal of the buffer particles, while the cutting particles are maintained.

Alternatively or additionally, the buffer particles may have a lower chemical resistance than the cutting particles. This lower chemical resistance is used in the sense of the machining tool being subjected to a chemical process during which a substance gets in contact with both types of particles and leads to complete or partial removal of the buffer particles, while the cutting particles are maintained.

The cutting particles and the buffer particles may be partly embedded in a metal layer, especially a galvanic deposition layer or a chemical deposition layer. Covering of the tooth tip with the cutting particles and the buffer particles then is realized during a galvanization process or a chemical metal deposition process during which a metal layer is build up on the tooth tip and the cutting particles and the buffer particles are partly fixed in the metal layer such that one part of their surface is fixedly arranged in the metal layer and the other part of their surface protrudes from the metal layer. In this way the geometrically undefined cutting portions of the cutting particles may get in contact with the material of the workpiece to be machined when using the machining tool.

The metal layer consists of metal, especially nickel, chrome or copper, that has deposited on the tooth tip as metal ion during galvanization or chemical metal deposition. The metal ions and the metal of the metal layer are not the buffer particles. The buffer particles are additional particles to be differentiated from the metal ions and the metal of the metal layer.

However, the cutting particles and the buffer particles may also be partly embedded in a differently designed bond layer. It is especially possible to use the following bond types: resin bond, ceramics bond, sintered metal bond and galvanic bond.

The covered part of the tooth tip may consist of between approximately 10 and 60%, especially between approximately 10 and 50%, especially between approximately 20 and 50%, especially between approximately 30 and 50%, buffer particles. This share (or percentage) relates to the covered surface of the tooth tip and not the entire surface of the tooth tip. Usually, there also are portions of the tooth tip which are neither covered with cutting particles nor with buffer particles. In case the tooth tip is coated with a metal layer as this has been explained above, these portions being free from cutting particles and buffer particles are also coated by the metal layer. The covering percentage of the covered part of the tooth tip approximately corresponds to the mixing proportion of these particles by which they have been provided for the covering process when the size of the cutting particles and of the buffer particles is approximately the same. The above-mentioned number ranges ensure sufficiently great distances between the cutting particles when considering the stochastic distribution to prevent the above-described negative effects during machining.

The cutting particles and the buffer particles may have approximately the same average size. As it has been described above, the mixing proportion before the covering process then approximately corresponds to the ratio of the particles on the covered tooth tip. However, it is also possible that the cutting particles and the buffer particles have different average sizes.

The average size of the cutting particles and the average size of the buffer particles may be between approximately 60 and 800 μm, especially between approximately 100 and 800 μm, especially being between approximately 200 and 800 μm, especially between approximately 300 and 800 μm, especially between approximately 400 and 800 μm, especially between approximately 500 and 800 μm, especially between approximately 500 and 700 μm, especially approximately 600 μm. Such ranges ensure that the cutting particles provide the desired geometrically undefined cutting portions and that they are spaced apart from one another by the buffer particles in the desired way.

The cutting particles may be hard or highly hard.

Hard cutting particles are especially understood as such ones being made of corundum ($Al_2O_3$) or silicon carbide (SiC).

Highly hard cutting particles may include monocrystalline diamond (MCD), polycrystalline diamond (CVD-D), polycrystalline diamond (PCD), cubic bornitride (CBN), cutting ceramics, carbide or combinations thereof.

The buffer particles may include monocrystalline diamond (MCD), polycrystalline diamond (CVD-D), polycrystalline diamond (PCD), cubic bornitride (CBN), silicon carbide, cutting ceramics, carbide, plastic, glass, ceramics, boron carbide, nickel, copper or combinations thereof.

The cutting particles may include cubic bornitride (CBN) and the buffer particles may include diamond. Since diamond dissolves at approximately 720° C. and CBN is resistant at this temperature, the lower heat resistance is used in this case to fully or partly remove the buffer particles.

The cutting particles may include diamond, silicon carbide, cutting ceramics, carbide or combinations thereof, and the buffer particles may include plastic, glass, ceramics, boron carbide, nickel, copper or combinations thereof.

The tooth tip may be formed or partly formed by a separately produced attachment element. The attachment element is fixedly connected to the remaining part of the tooth via a connecting zone. Suitable connecting methods are gluing, soldering, brazing or welding, for example.

The first connecting surface of the attachment element forming the free tooth tip may substantially correspond to the directly adjacent region of the first connecting surface of the remaining part of the tooth. However, it is also possible that they are differently designed. The same applies to the second connecting surface.

The attachment element is designed to be asymmetrical to form the asymmetrical tooth tip. The directly adjacent region of the first connecting surface of the remaining part of the tooth may also be designed to be asymmetrical. However, it is also possible that it is designed to be symmetrical.

The attachment element may be designed as a sintered element. The sintered element is made of a mixture of a binder and of the cutting particles. For example, the binder may be copper, cobalt, iron, bronze, nickel or mixtures thereof. It is also possible that there are buffer particles in addition.

It is to be understood that the machining tool does not only include one tooth having such a design, but instead a plurality, especially a great number, of such teeth. These may be all teeth of the machining tool. However, it is also possible that differently designed teeth are additionally arranged at the machining tool.

The machining tool includes a tooth supporting body at which the teeth are arranged. The teeth may be designed as one piece with the tooth supporting body or to be separate from the tooth supporting body. In the latter case, the teeth or tooth tips are fixedly connected to the tooth supporting body or tooth protrusions—especially by welding, soldiering or brazing. The tooth supporting body has an elongated band-shaped design or the shape of a circular disk. In other words, the machining tool is a machining band being similar are to a saw band or a circular machining blade being similar to a circular saw blade.

The teeth may be arranged at the tooth supporting body at a constant division. This means that the distance between the teeth is constant. However, it is also possible that the teeth are arranged at the tooth is supporting body at a variable division. This means that the distances between the teeth vary. Especially, between two and ten different distances may exist between the teeth at the machining tool.

The tooth supporting body is made of a suitable material. Especially, this is a metal material. Examples are spring steel and alloyed tempered steel.

However, the machining tool may also be a different machining tool including geometrically undefined cutting portions. The machining tool may be especially a grinding disc, a grinding belt or a different tool for grinding, honing, lapping, beam machining or slip machining.

The materials to be machined are especially nonmetallic inorganic materials and composite materials. These materials may be especially glass, graphite, hard-burnt coal, ceramics, silicon, concrete materials, CFK, sintered materials and natural stones. However, they may also be metal materials.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if a tooth is mentioned, this is to be understood such that there is exactly one tooth or there are two teeth or more teeth. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Figure 1:
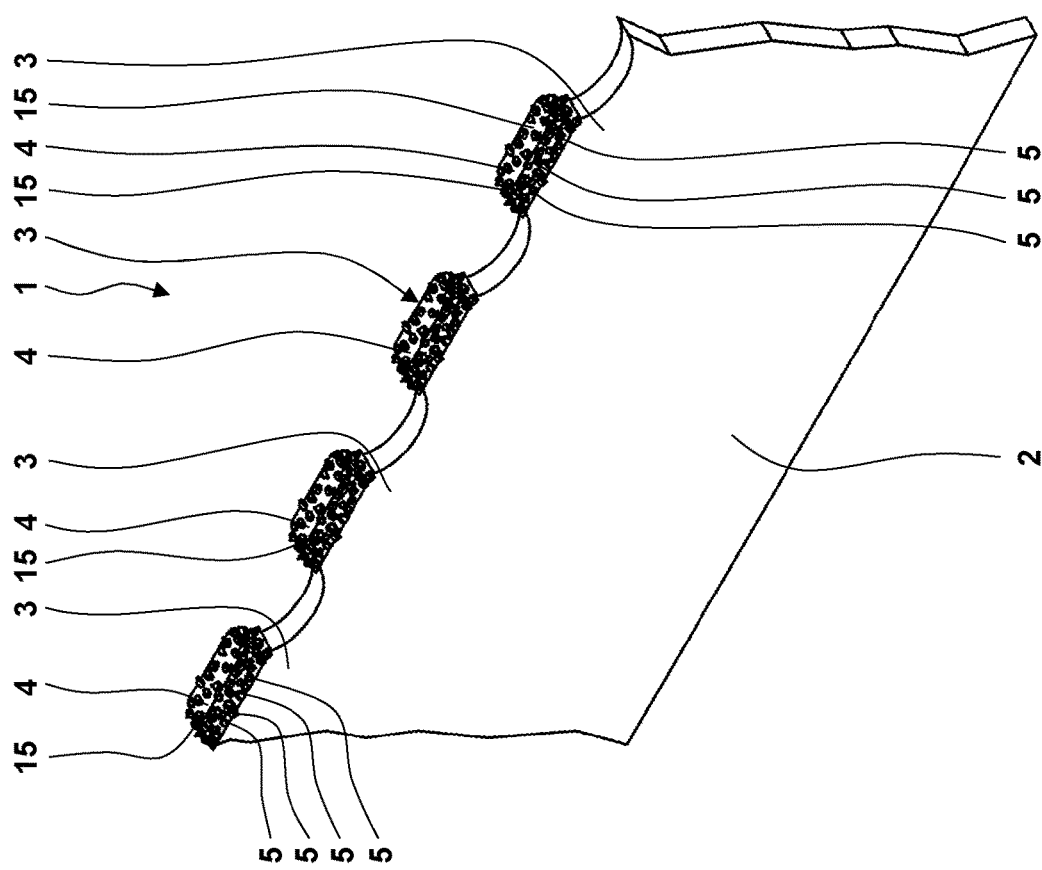
FIG. 1 illustrates a perspective view of a part of a first exemplary embodiment of the new machining tool.
Figure 2:
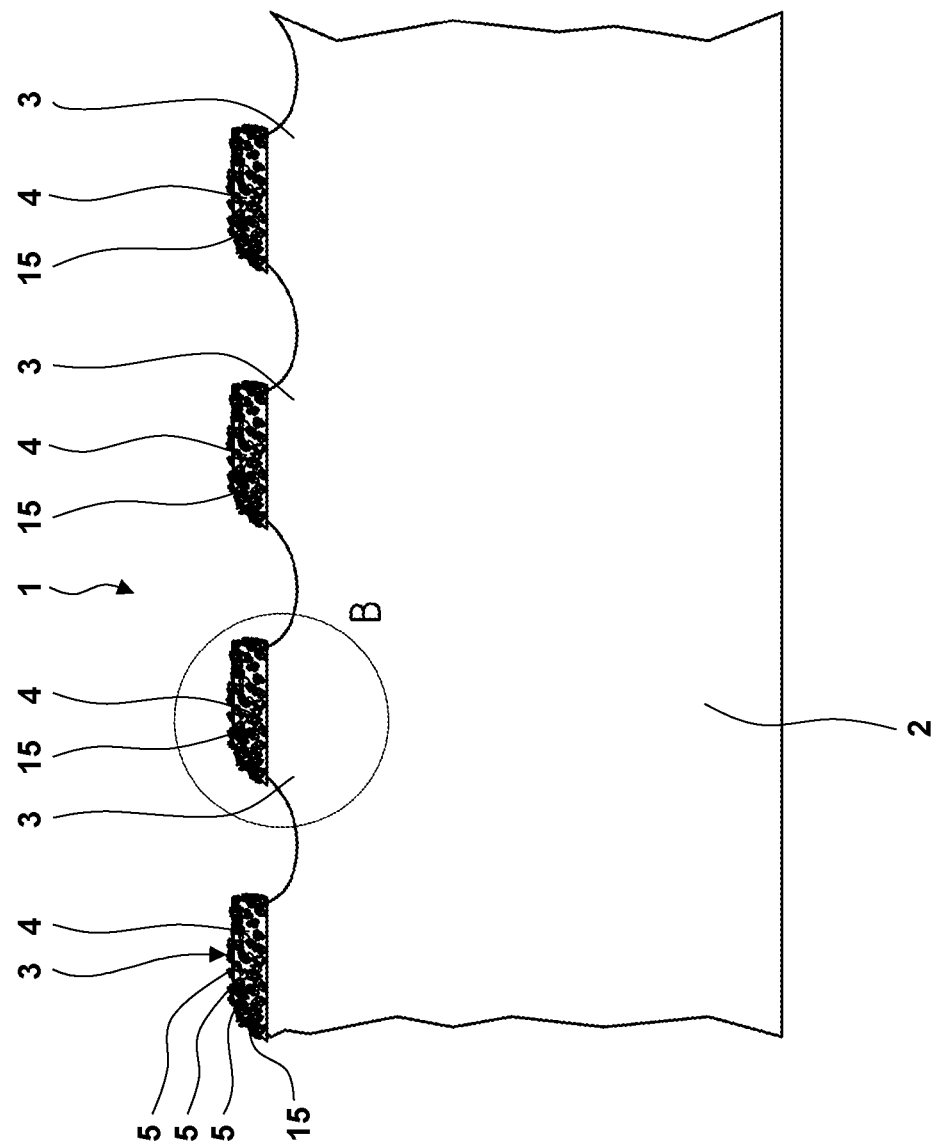
FIG. 2 illustrates a side view of the machining tool according to FIG. 1.
Figure 3:
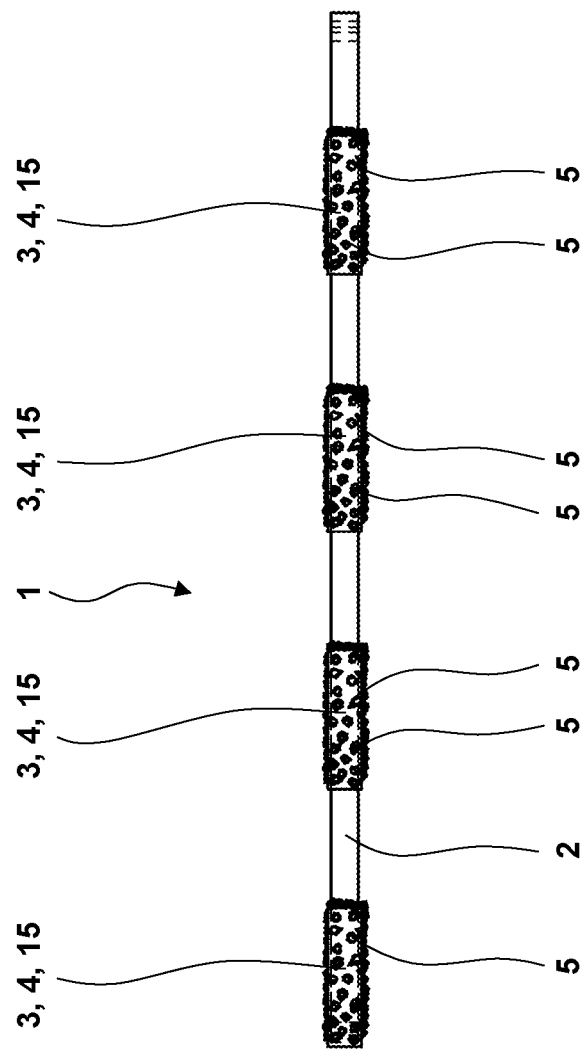
FIG. 3 illustrates a view from above of the machining tool according to FIG. 1.
Figure 4:
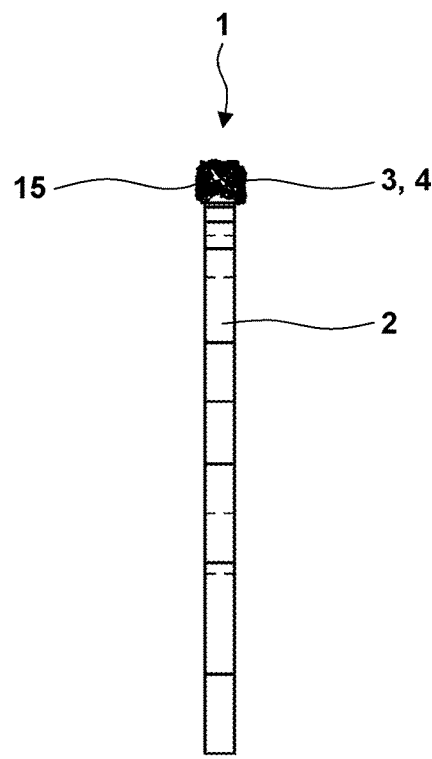
FIG. 4 illustrates a view from the front of the machining tool according to FIG. 1.
Figure 5:
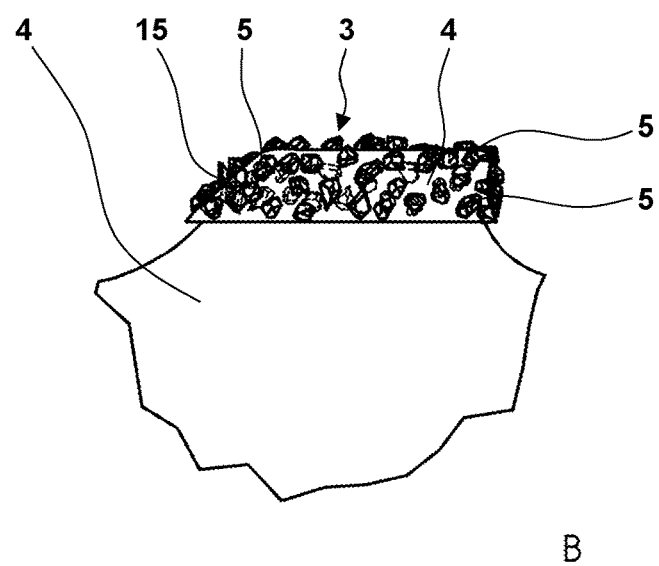
FIG. 5 illustrates the detail B of the machining tool from FIG. 2.

FIGS. 1-5 illustrate different views of a first exemplary embodiment of a new machining tool 1. The machining tool 1 includes a tooth supporting body 2. In the present case, this is an elongated band-shaped machining tool 1 of which only a section is illustrated. It is to be understood that the machining tool 1 thus respectively extends further beyond the abruption lines shown in FIG. 1. However, the machining tool 1 could also have the shape of a circular disk. The following statements also apply to such an embodiment.

The machining tool 1 includes a plurality of teeth 3 being arranged at the tooth supporting body 2. The teeth 3 may be designed to be partly or fully integral with the tooth supporting body 2. In the present example, the teeth 3 are arranged at the tooth supporting body 2 with a constant division. However, they could also be arranged at the tooth supporting body 2 with a variable division.

The teeth 3 each include a tooth tip 4 facing away from the tooth supporting body 2. The tooth tip 4 is fully or partly covered by (or equipped with) cutting particles 5 and buffer particles 6 in a cutting particle cover region 15. The cutting particles 5 are hard or highly hard. For example, the material may be corundum ($Al_2O_3$), monocrystalline diamond (MCD), polycrystalline diamond (CVD-D) and the like. For reasons of clarity, only a few of the cutting particles are designated with the reference numeral 5. The ending of the cutting particle cover region 15 in which the cutting particles 5 are located is symbolized by a horizontal line.

Figure 6:
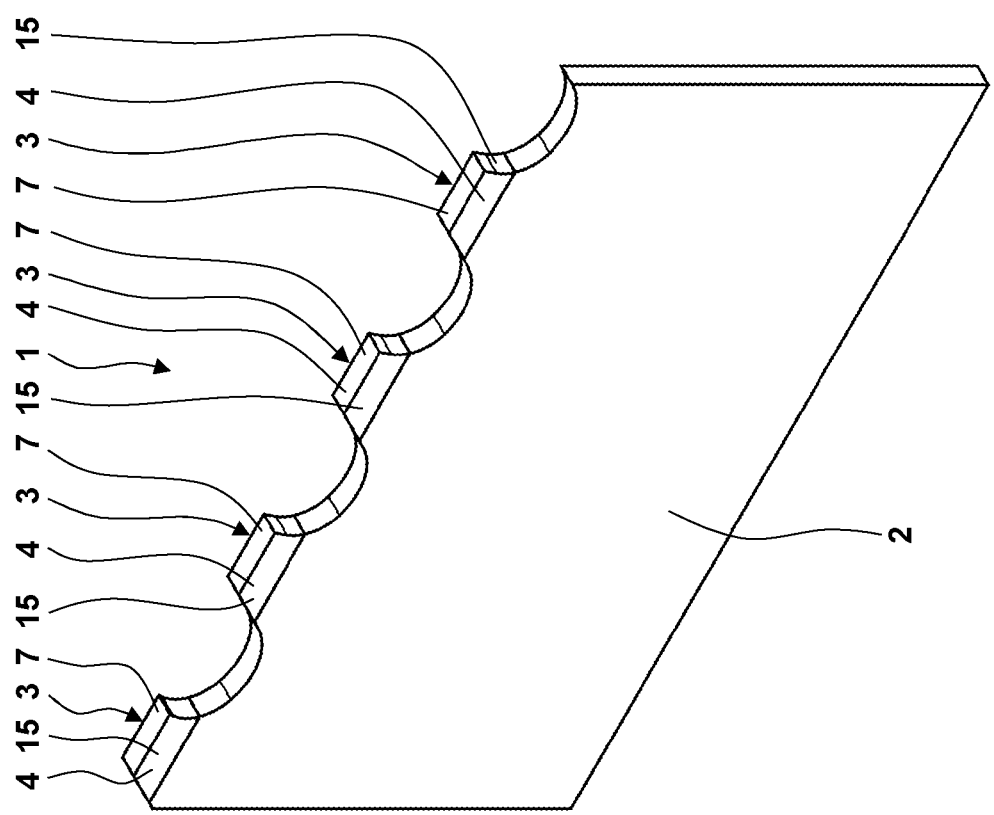
FIG. 6 illustrates the machining tool according to FIG. 1 without illustrating the cutting particles.
Figure 7:
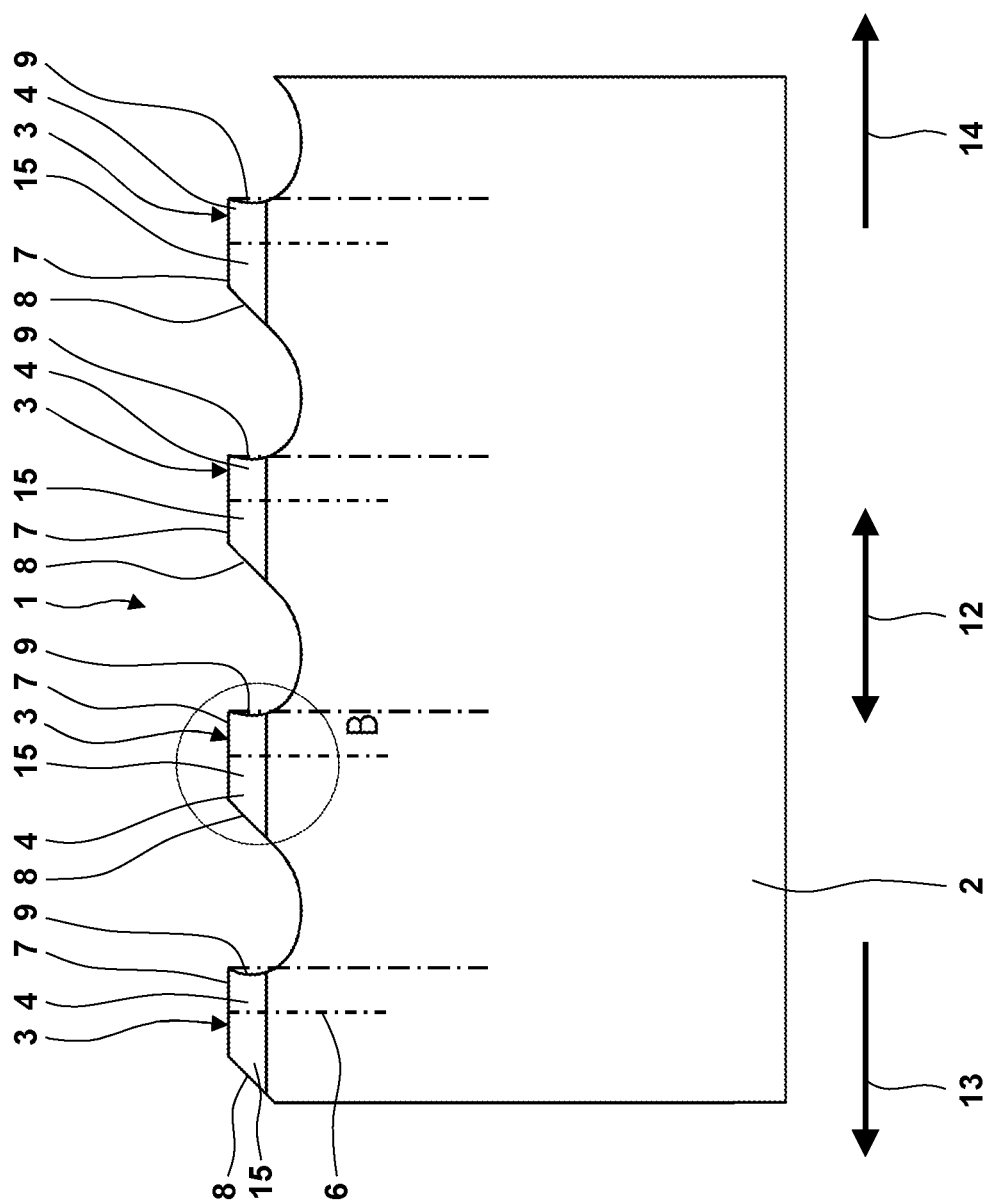
FIG. 7 illustrates the machining tool according to FIG. 2 without illustrating the cutting particles.
Figure 8:
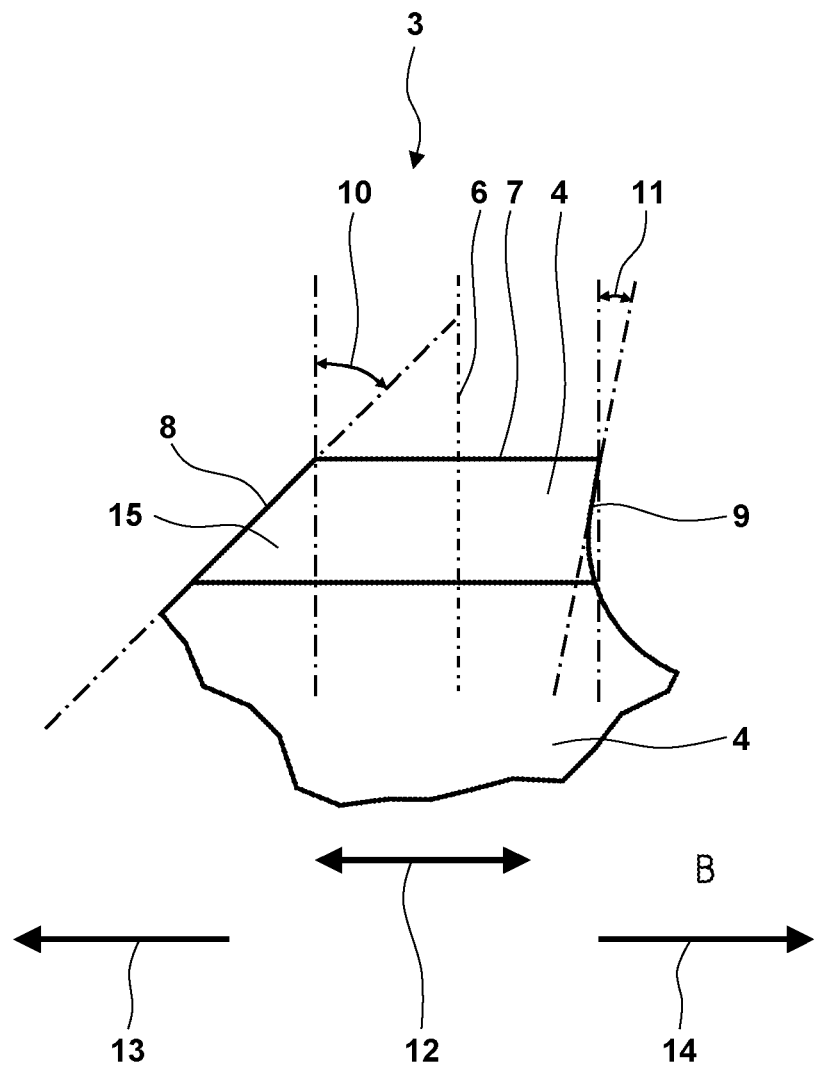
FIG. 8 illustrates that detail B according to FIG. 5 without illustrating the cutting particles.

The shape of the tooth tip 4 can be seen easier in the illustrations of FIGS. 6, 7 and 8. Compared to the respective FIGS. 1, 2 and 5, the cutting particles are not illustrated in these figures. However, it is to be understood that the cutting particles also exist in these figures and the following figures. Once again, the ending of the region in which cutting particles exist is symbolized by a horizontal line.

The tooth tips 4 each include a longitudinal center axis 6, a plateau surface 7, a first connecting surface 8 and a second connecting surface 9. The first connecting surface 8 and the second connecting surface 9 are located directly next to the plateau surface 7. However, it would also be possible that there was an indirect connection, i.e. another surface was located between the plateau surface 7 and the respective connecting surface 8, 9.

The tooth tip 4 is designed to be asymmetrical. This means that the first connecting surface 8 extends at a first side of the longitudinal center axis 6 (in this case: the left side) under a first tooth tip angle 10 having a first value with respect to the plateau surface 7 and that the second connecting surface 9 extends at an opposite second side of the longitudinal center axis 6 (in this case: the right side) under a second tooth tip angle 11 having a different second value with respect to the plateau surface 7 (see FIG. 8).

The tooth tip angles 10, 11 are herein defined with respect to a vertical line. In case of the illustrated exemplary embodiment, the value of the first tooth tip angle 10 is approximately 45° and the value of the second tooth tip angle 11 is approximately 20°.

When the machining tool 1 is moved in a first sense of direction of movement 13 (in this case: to the left), the first connecting surface 8 is the active machining surface which first gets in contact with the material of the workpiece to be machined. The first tooth tip angle 10 is a negative tooth tip angle as seen in this first sense of direction of movement 13. The machining tool has gentle machining properties when machining in this first sense of direction of 13, and it is especially well suitable to machine brittle materials.

However, when the machining tool 1 is driven and moved in the opposite second sense of direction of movement 14 (in this case: to the right), the second connecting surface 9 is the active machining surface. For example, this may be realized by inverting the rotation direction of the motor of the machining apparatus driving the machining tool 1. Another possibility to activate the second connecting surface 9 is to invert the orientation (arrangement) of the machining tool 1 in the machining apparatus. In both cases, it is achieved that the active machining surface now has a positive tooth angle which results in more aggressive machining properties. Now, one and the same machining tool 1 is especially well suitable for machining ductile materials.

Figure 9:
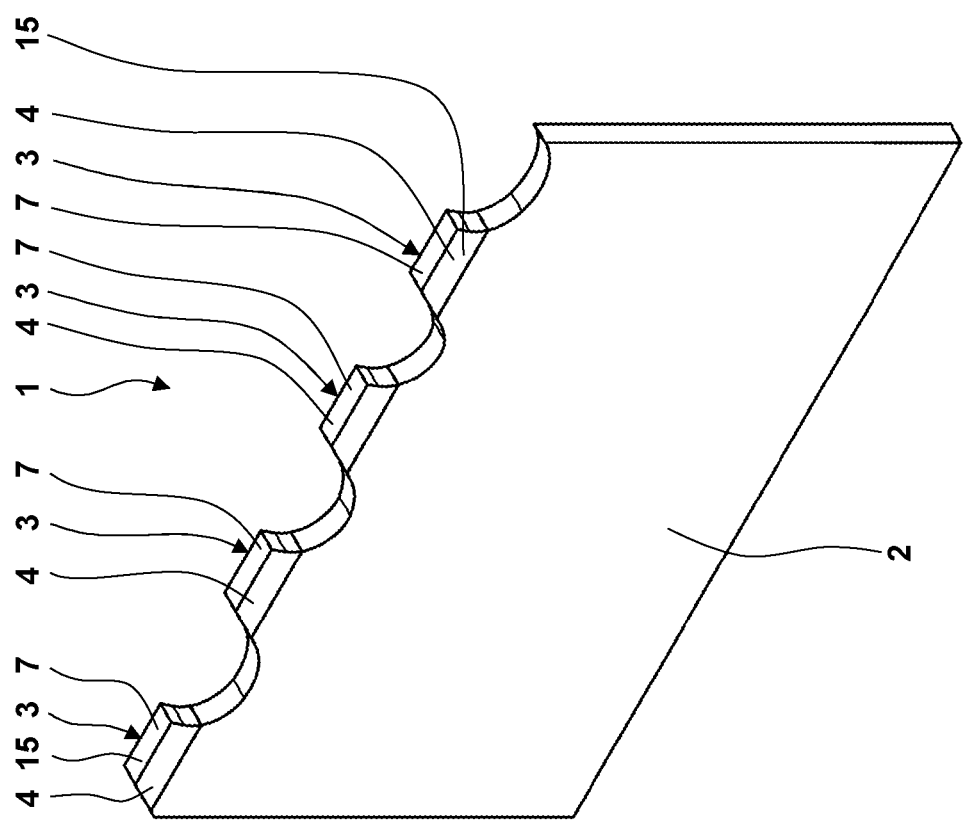
FIG. 9 illustrates a perspective view of a second exemplary embodiment of the new machining tool without illustrating the cutting particles.
Figure 10:
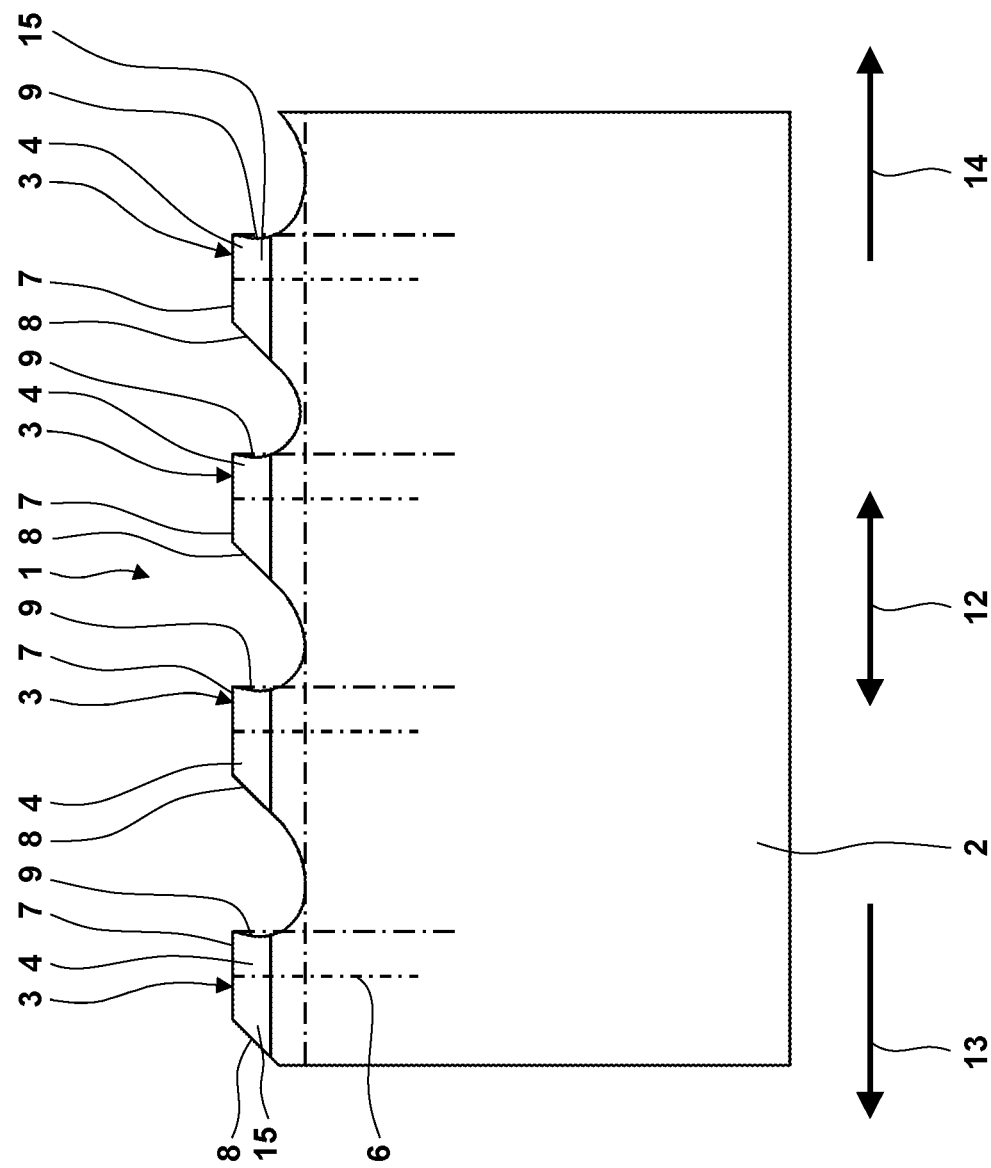
FIG. 10 illustrates a side view of the machining tool according to FIG. 9.

FIGS. 9 and 10 illustrate a second exemplary embodiment of the new machining tool 1. This embodiment has a lot in common with the above-described embodiments such that it is referred to the above statements to prevent unnecessary repetitions. The same applies to the additional below-described embodiments.

In contrast thereto, the teeth 3 are located at the tooth supporting body 2 with a variable division which can be seen from the longer dash-dotted lines in FIG. 10. The distance between the first tooth 3 and the second tooth 3 is greater than the distance between the second tooth 3 and the third tooth 3 (see FIG. 10: as seen from the left towards the right). The distance between the third tooth 3 and the fourth tooth 3 is smaller than the distance between that second tooth 3 and the third tooth 3. However, the variable division could also be different.

Figure 11:
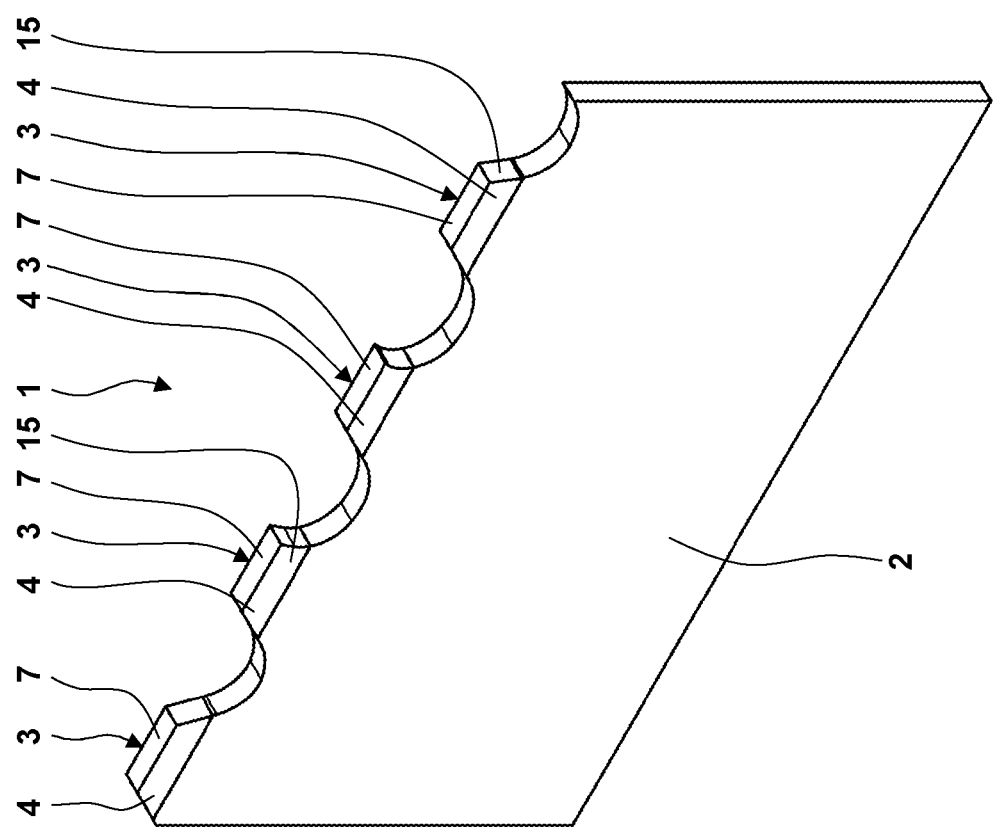
FIG. 11 illustrates a perspective view of a third exemplary embodiment of the new machining tool without illustrating the cutting particles.
Figure 12:
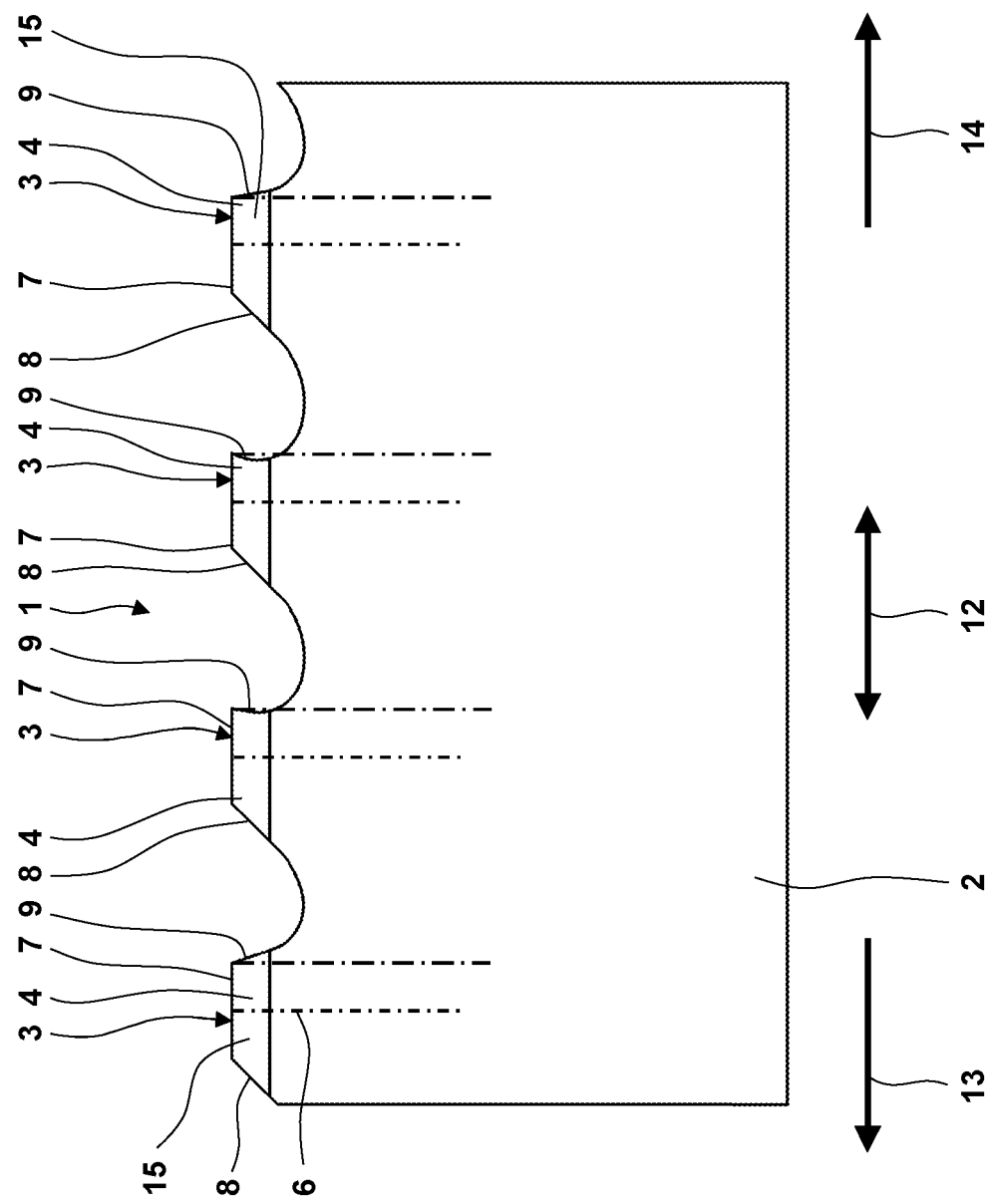
FIG. 12 illustrates a side view of the machining tool according to FIG. 11.
Figure 13:
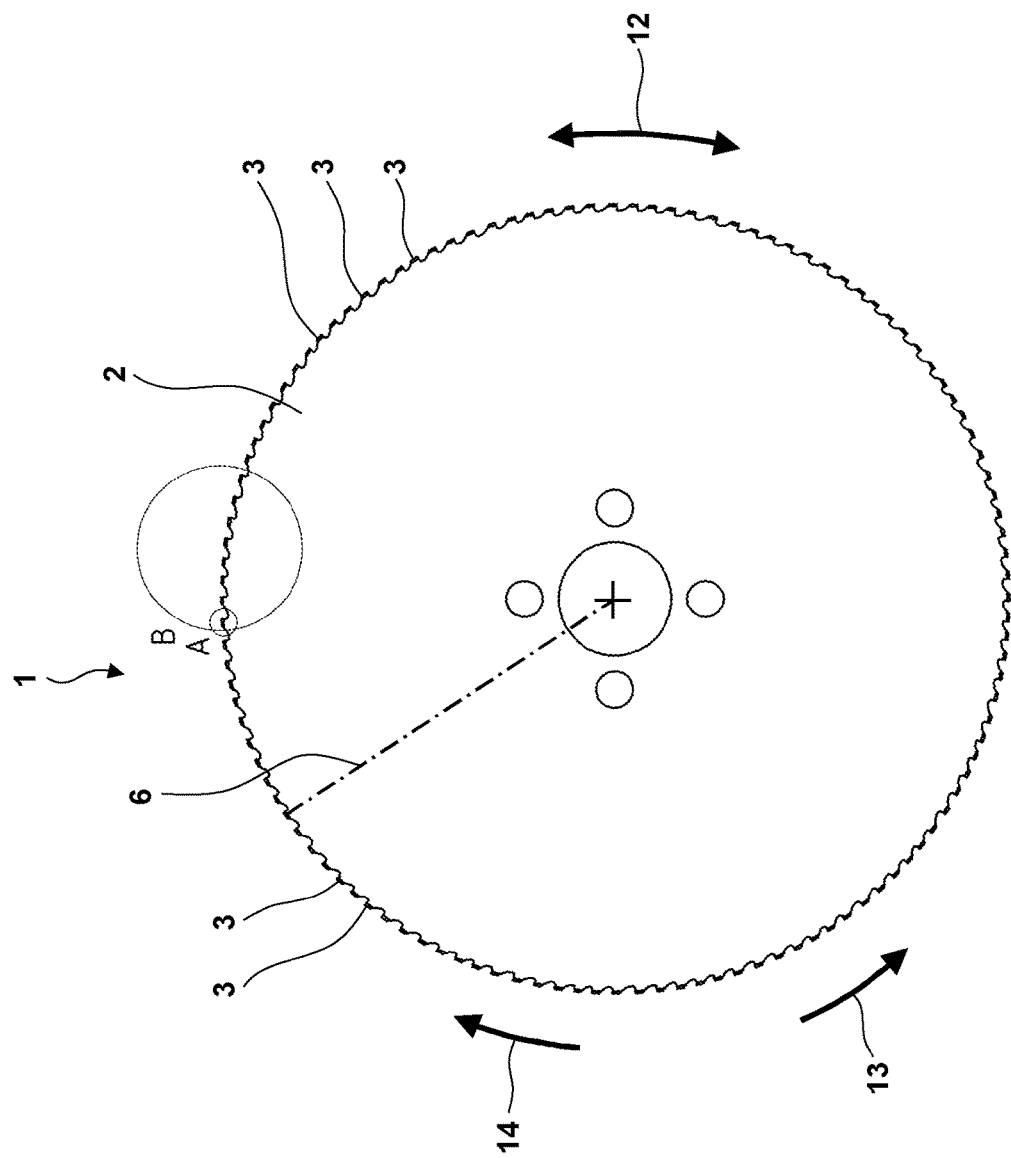
FIG. 13 illustrates a side view of a fourth exemplary embodiment of the new machining tool without illustrating the cutting particles.
Figure 14:
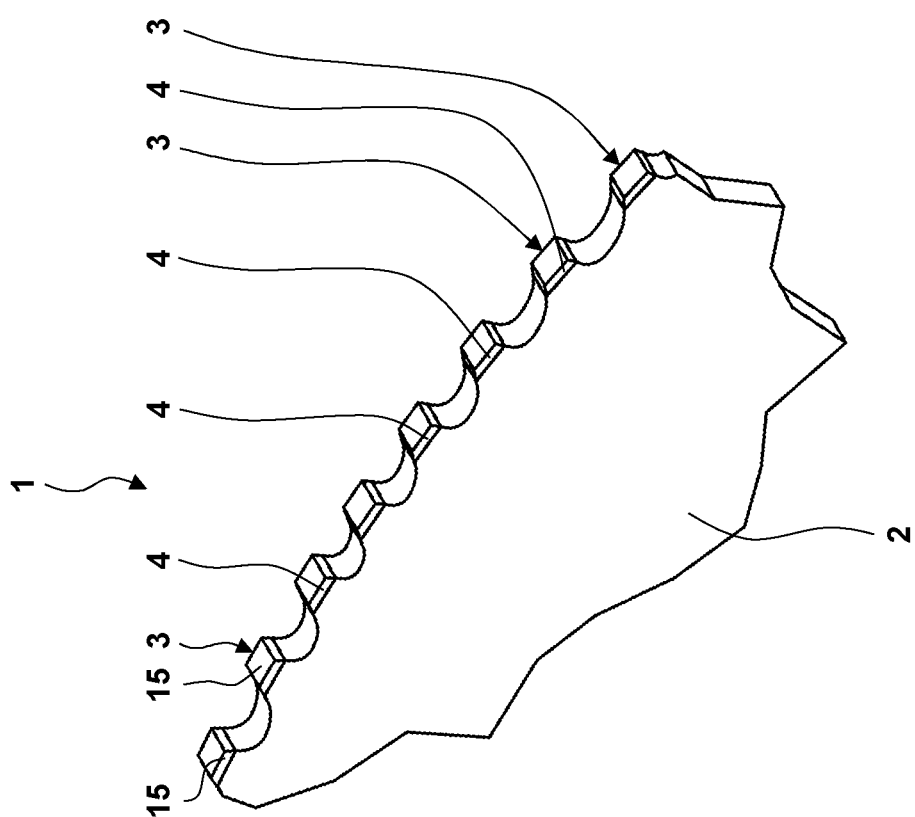
FIG. 14 illustrates a perspective view of a part of the machining tool according to FIG. 13.
Figure 15:
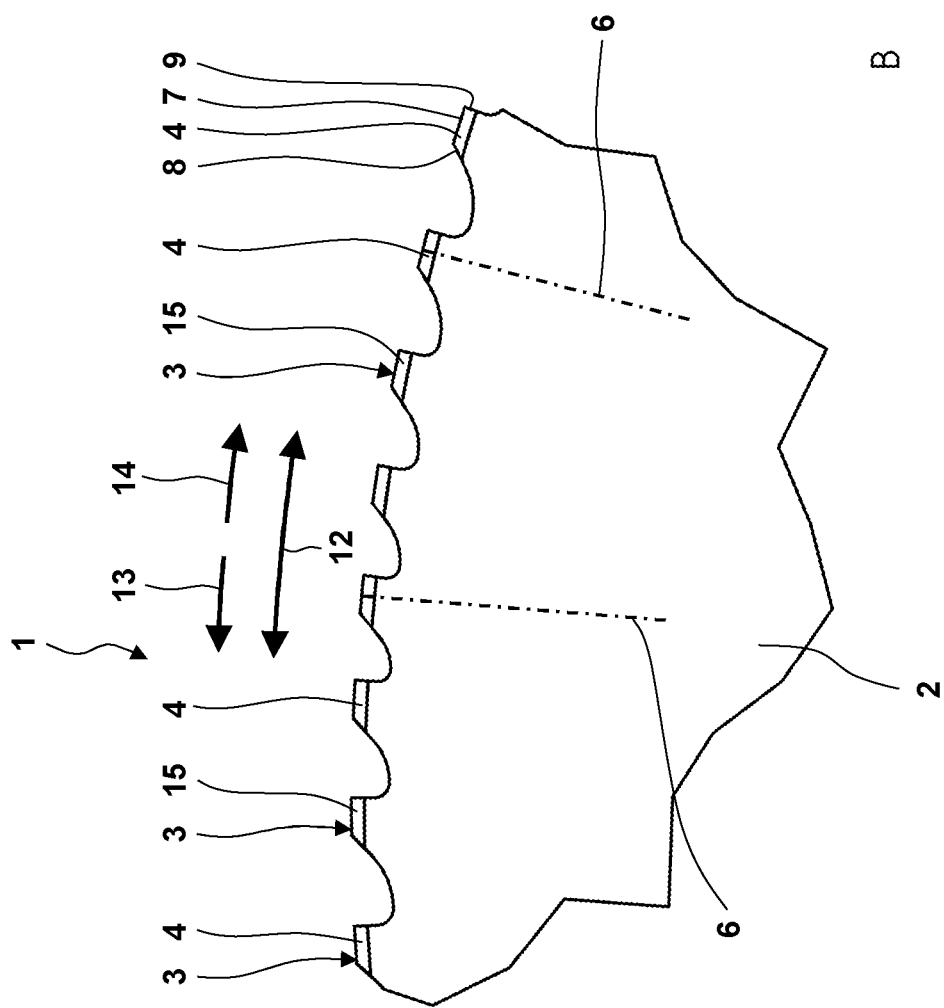
FIG. 15 illustrates the detail B from FIG. 13.
Figure 16:
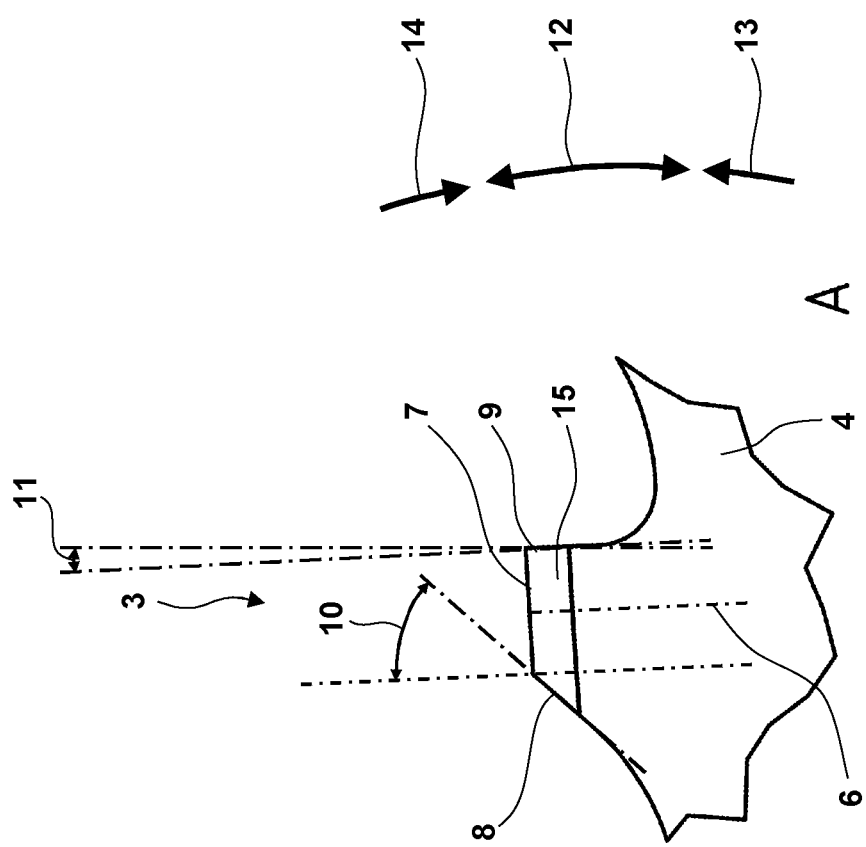
FIG. 16 illustrates the detail A from FIG. 13.

FIGS. 11 and 12 illustrate a third exemplary embodiment of the new machining tool 1. In this case, the teeth 3 have different designs among each other. In addition to the above-described first type of teeth 3 (FIG. 12: the second tooth 3 and the third tooth 3 as seen from the left), there is a second type of teeth 3 (FIG. 12: the first tooth 3 and the fourth tooth 3 as seen from the left) in which both tooth tip angles 10, 11 are negative. The tooth tip 4 is also designed to be asymmetrical in these teeth 3 since the values of the tooth tip angles 10, 11 are different. The value of the first tooth tip angle 10 of the first tooth 3 here is approximately 45°, while the value of the second tooth tip angle 11 of the first tooth 3 is approximately 20°. The value of the first tooth tip angle 10 of the fourth tooth 3 is also approximately 45°, while the value of the second tooth tip angle 11 of the fourth tooth 3 is approximately 10°. The teeth 3 are arranged at the tooth supporting body 2 with a constant division. However, they could also be arranged with a variable division.

FIGS. 13-16 illustrate different views of a fourth exemplary embodiment of the new machining tool 1. In this case, the machining tool 1 is designed as a circular machining blade, i.e. the tooth supporting body 2 has the shape of a circular disk. The teeth 3 are arranged at the tooth supporting body 2 with a variable division. The first tooth tip angle 10 is negative. Its value is approximately 45°. The second tooth tip angle 11 is approximately 2°.

Figure 17:
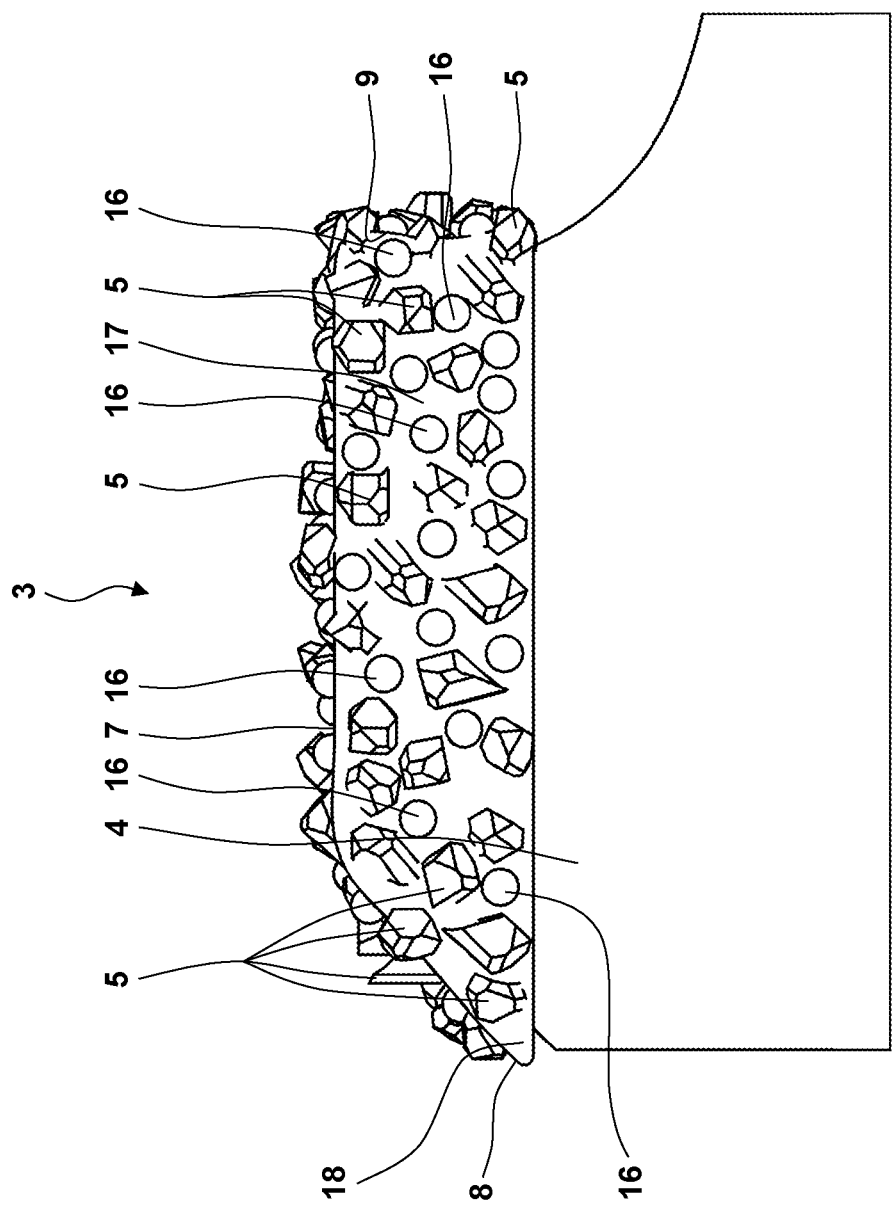
FIG. 17 illustrates a tooth tip of a tooth of a fifth exemplary embodiment of the new machining tool from the front.
Figure 18:
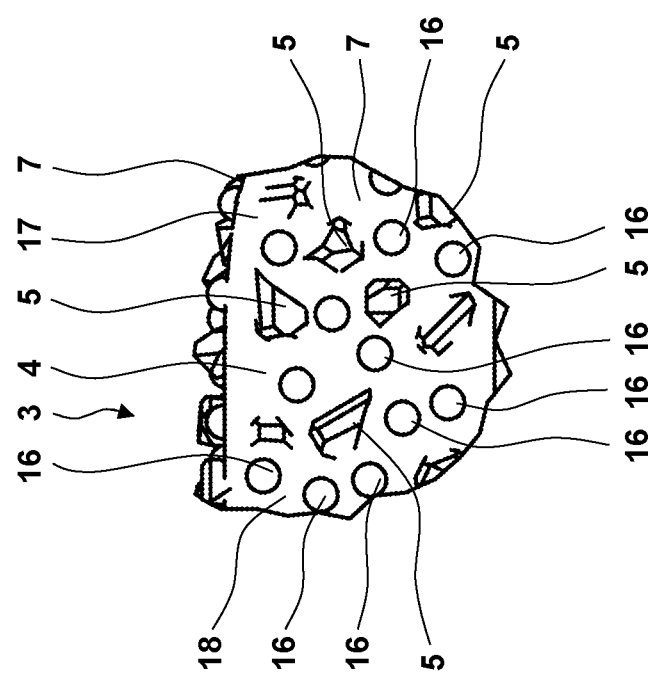
FIG. 18 illustrates a detail of a tooth tip according to a fifth exemplary embodiment of the new machining tool.
Figure 19:
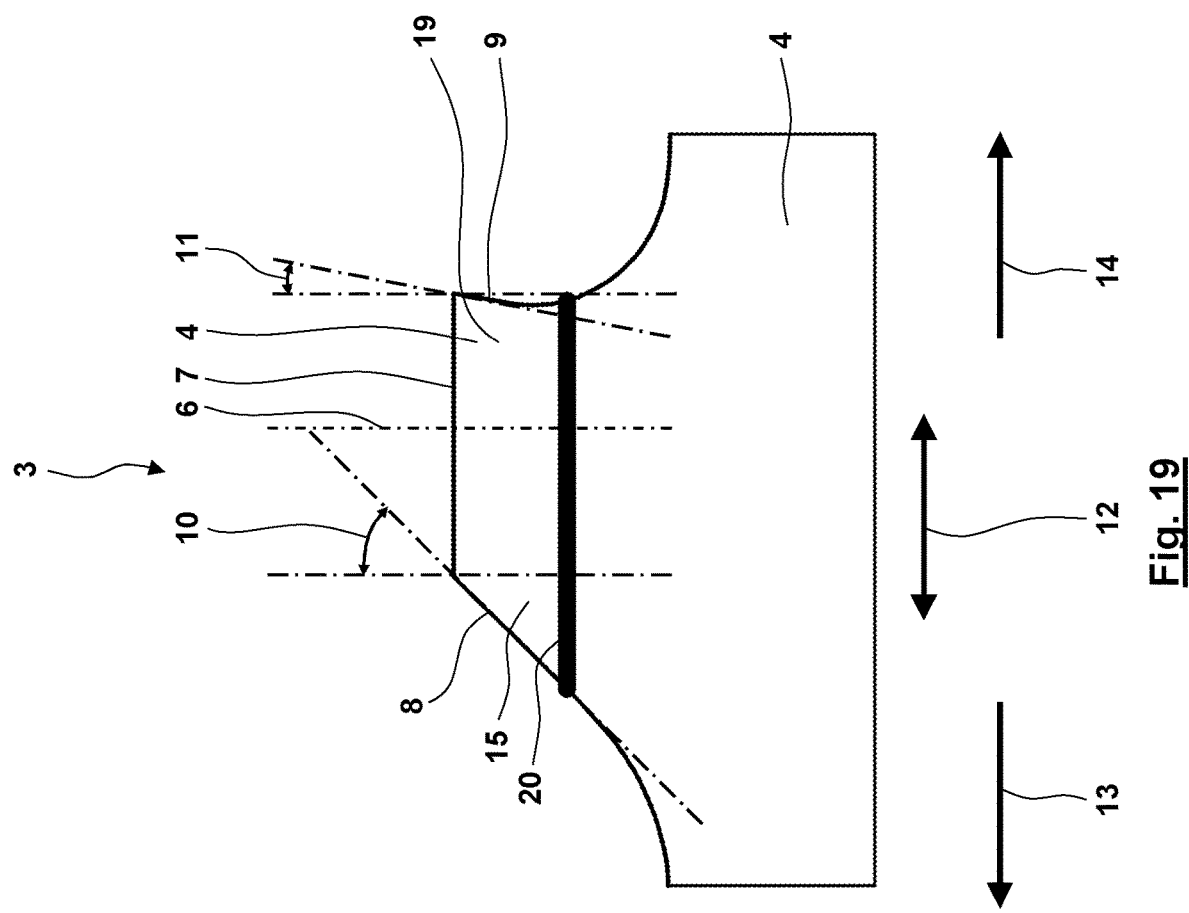
FIG. 19 illustrates a detailed view corresponding to FIG. 8 of a tooth tip according to another exemplary embodiment of the new machining tool.
Figure 20:
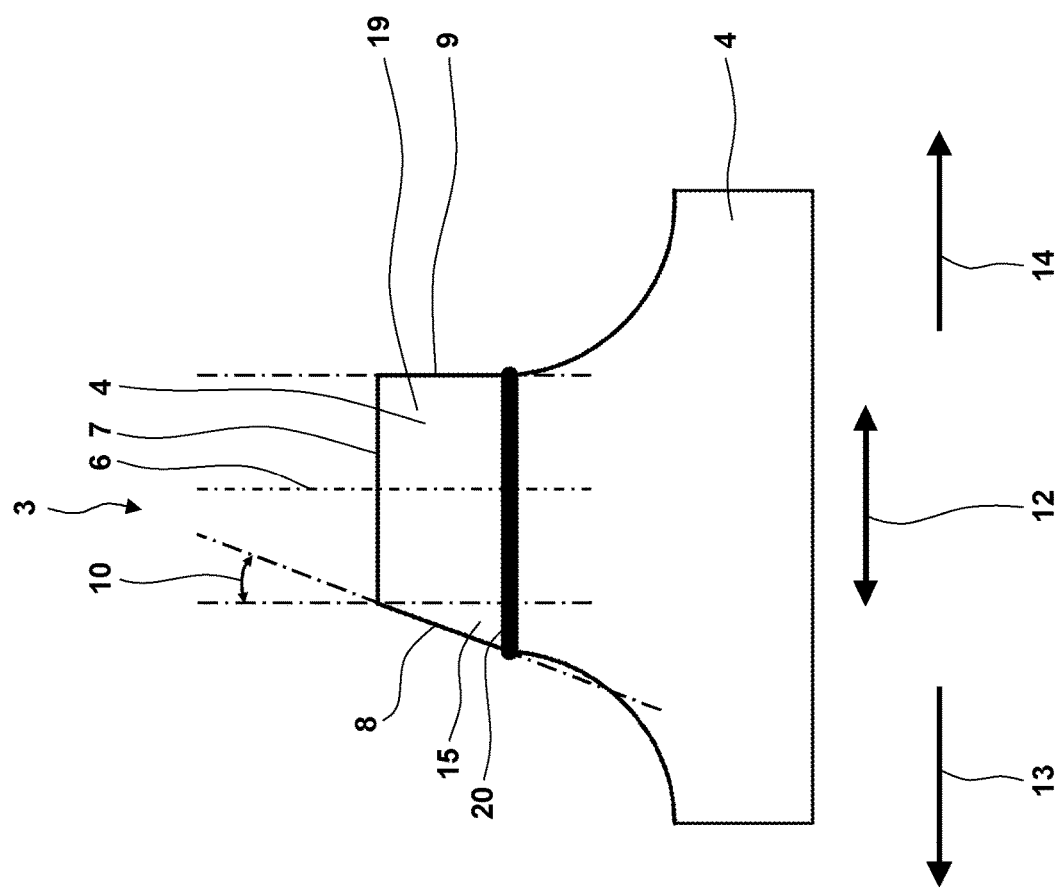
FIG. 20 illustrates a detailed view corresponding to FIG. 8 of a tooth tip according to another exemplary embodiment of the new machining tool.
Figure 21:
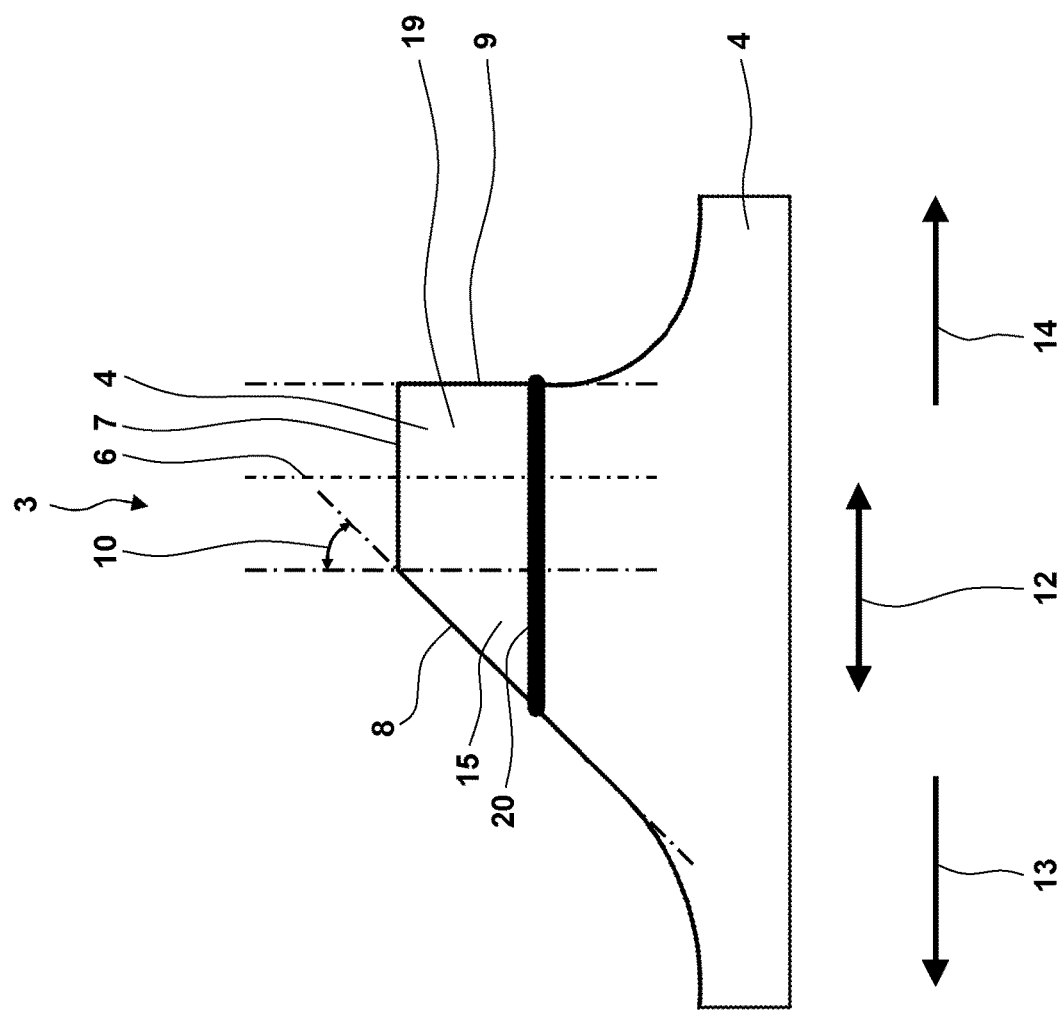
FIG. 21 illustrates a detailed view corresponding to FIG. 8 of a tooth tip according to another exemplary embodiment of the new machining tool.
Figure 22:
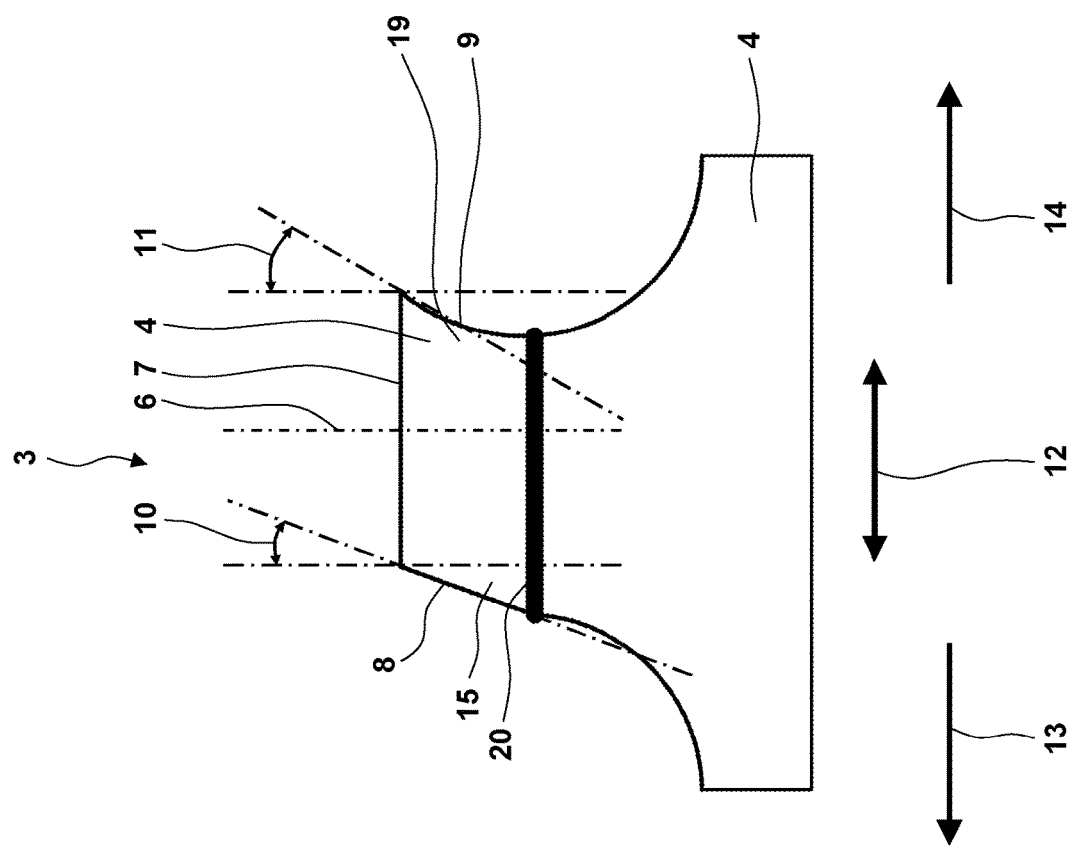
FIG. 22 illustrates a detailed view corresponding to FIG. 8 of a tooth tip according to another exemplary embodiment of the new machining tool.

FIGS. 17 and 18 illustrate a fifth exemplary embodiment of the new machining tool 1. In this case, the tooth tip 4 is not only covered with cutting particles 5, but instead also with buffer particles 16. The cutting particles 5 and the buffer particles 16 are fixedly located in a metal layer 17, and they are partly embedded in this metal layer 17. Thus, they partly protrude from the metal layer 17. The metal layer 17 especially is a galvanic deposition layer or a chemical metal deposition layer.

The cutting particles 5 and the buffer particles 16 differ with respect to their materials and their functions to be fulfilled. In this regard, it is referred to the above detailed explanations.

The cutting particles 5, the buffer particles 16 and the metal layer 17 commonly form a cover region 18 fulfilling the desired machining function of the machining tool 1 by including the cutting portions being required for this purpose. This cover region 18 extends over the entire tooth tip 4 or over a part of the tooth tip 4. This is the covered part of the tooth tip 4.

It is to be understood that the illustrations of FIGS. 17 and 18 are not true to scale and that the shape of the particles 5, 16 practically is different or may be different. The particles 5, 16 may also have approximately the same shape. The illustration intends to make it possible to differentiate the particles 5, 16 and to emphasize that, due to the arrangement of the buffer particles 16, one attains free spaces between the cutting particles 5. These free spaces would not exist or not to such an extent when only arranging cutting particles 5 as this is known in the prior art.

With respect to additional possible designs of the machine tool 1 and of the tooth tips 4, it is referred to the statements with respect to FIGS. 1-16. In other words, the embodiments of the machining tool 1 according to FIGS. 1-16 may include the buffer particles 16.

FIGS. 19-22 illustrate detailed views corresponding to FIG. 8 of additional exemplary embodiments of the tooth tip 4 of the machining tool 1. In these embodiments, the tooth tip for is formed and partly formed, respectively, by a separately produced attachment element 19. The attachment element 19 is fixedly connected to the remaining part of the tooth 3 via a connecting zone 20. Suitable connecting methods are gluing, soldering, brazing or welding, for example. The connecting zone 20 is symbolically illustrated by the thicker black line.

It is perceptible from the different embodiments that the first connecting surface 8 of the attachment element 19 forming the free tooth tip 4 may substantially correspond to or differ from the directly adjacent region of the first connecting surface 8 of the remaining part of the tooth 3. The same applies to the second connecting surface 9.

The attachment element 19 may be designed as a sintered element. The sintered element is made of a mixture of a binder and of the cutting particles. For example, the binder may be copper, cobalt, iron, bronze, nickel or mixtures thereof. It is also possible that there are buffer particles in addition.

Many variations and modifications may be made to the preferred embodiments of the invention without departing substantially from the spirit and principles of the invention. All such modifications and variations are intended to be included herein within the scope of the present invention, as defined by the following claims.

I claim:

1. A method of machining two workpieces of different materials, the method comprising:
   providing exactly one machining tool, the machining tool including a tooth having an asymmetrical tooth tip being covered with cutting particles to form a plurality of geometrically undefined cutting portions;
   inserting the machining tool in a first orientation into a machining apparatus including a motor;
   machining a first workpiece of a first material with the machining tool in the first orientation by driving the tooth of the machining tool in a first sense of direction of movement; and
   a1. Switching the motor to drive the machining tool in an opposite second sense of direction of movement, and
   a2. Machining a second workpiece of a different second material with the machining tool in the first orientation by driving the same tooth of the machining tool in the second sense of direction of movement;
   or
   b1. Removing the machining tool from the machining apparatus, and
   b2. Inserting the machining tool in an opposite second orientation in the machining apparatus, and
   b3. Machining a second workpiece of a different second material with the machining tool in the second orientation by driving the same tooth of the machining tool in the first sense of direction of movement.

2. The method of claim 1, wherein the tooth tip has a longitudinal center axis, a plateau surface, a first connecting surface and a second connecting surface, wherein the first connecting surface and the second connecting surface are connected to the plateau surface, wherein the first connecting surface extends at a first side of the longitudinal center axis under a first tooth tip angle having a first value with respect to the plateau surface, and wherein the second connecting surface extending at an opposite second side of the longitudinal center axis under a second tooth tip angle having a different second value with respect to the plateau surface.

3. The method of claim 2, wherein the first tooth tip angle is less than 0° as seen in a first sense of direction of movement in which the first connecting surface precedes the second connecting surface, and wherein the second tooth tip angle is greater than 0° in an opposite second sense of direction of movement in which the second connecting surface precedes the first connecting surface.

4. The method of claim 3, wherein the first tooth tip angle is between less than 0° and −80° and the second tooth tip angle is between 0° and 20°.

5. The method of claim 1, wherein upon movement of the machining tool in the first sense of direction of movement, a first connecting surface is an active machining surface which first comes into contact with the workpiece, and, upon movement of the machining tool moves in the second sense of direction of movement, a second connecting surface is the active machining surface which first comes into contact with the workpiece.

6. The method of claim 5, wherein the machining tool moves in the first sense of direction of movement when sawing a brittle material and the machining tool moves in the second sense of direction of movement when sawing a ductile material.

7. The method of claim 6, wherein the machining tool is a saw band.

8. A method of machining a ductile workpiece and a brittle workpiece, the method comprising:
   providing exactly one machining tool comprising a saw band, the saw band comprising a tooth having an asymmetrical tooth tip covered with cutting particles to form a plurality of cutting portions, wherein the tooth tip has a longitudinal center axis, a plateau surface, a first connecting surface and a second connecting surface, wherein the first connecting surface and the second connecting surface are connected to the plateau surface, wherein the first connecting surface extends at a first side of the longitudinal center axis under a first tooth tip angle having a first value with respect to the plateau surface, and wherein the second connecting surface extending at an opposite second side of the longitudinal center axis under a second tooth tip angle having a different second value with respect to the plateau surface, wherein the first tooth tip angle is less than 0° as seen in a first direction of movement in which the first connecting surface precedes the second connecting surface, and wherein the second tooth tip angle is greater than 0° in an second direction of movement that is opposite to the first direction and in which the second connecting surface precedes the first connecting surface;
   inserting the saw band into a machining apparatus including a motor;
   machining the brittle workpiece with the saw band by driving the tooth in the first direction of movement;
   switching the motor to drive the saw band in the second direction of movement; and
   machining the ductile workpiece with the saw band by driving the same tooth in the second direction of movement.

9. The method of claim 8, wherein upon movement of the saw band in the first direction, the first connecting surface is an active machining surface which first comes into contact with the brittle workpiece, and upon movement of the saw band in the second direction the second connecting surface is the active machining surface which first comes into contact with the ductile workpiece.

10. The method of claim 9, wherein the first tooth tip angle is between less than 0° and −80° and the second tooth tip angle is between 0° and 20°.

11. A method of machining a ductile workpiece and a brittle workpiece, the method comprising:
   providing exactly one machining tool comprising a saw band, the saw band comprising a tooth having an asymmetrical tooth tip covered with cutting particles to form a plurality of cutting portions, wherein the tooth tip has a longitudinal center axis, a plateau surface, a first connecting surface and a second connecting surface, wherein the first connecting surface and the second connecting surface are connected to the plateau surface, wherein the first connecting surface extends at a first side of the longitudinal center axis under a first tooth tip angle having a first value with respect to the plateau surface, and wherein the second connecting surface extending at an opposite second side of the longitudinal center axis under a second tooth tip angle having a different second value with respect to the plateau surface, wherein the first tooth tip angle is less than 0° as seen in a first direction of movement in which the first connecting surface precedes the second connecting surface, and wherein the second tooth tip angle is greater than 0° in an second direction of movement that is opposite to the first direction and in which the second connecting surface precedes the first connecting surface;

inserting the saw band in a first orientation into a machining apparatus including a motor;

machining the brittle workpiece with the saw band by driving the tooth in the first direction of movement;

removing the saw band from the machining apparatus;

inserting the saw band in a second orientation that is opposite to the first orientation into the machining apparatus; and machining the ductile workpiece with the saw band by driving the same tooth of the saw band in the first sense of direction of movement.

12. The method of claim 11, wherein upon movement of the saw band in the first orientation and the first direction, the first connecting surface is an active machining surface which first comes into contact with the brittle workpiece, and upon movement of the saw band in the second orientation and the first direction, the second connecting surface is the active machining surface which first comes into contact with the ductile workpiece.

13. The method of claim 12, wherein the first tooth tip angle is between less than 0° and −80° and the second tooth tip angle is between 0° and 20°.

* * * * *